(12) United States Patent
Yao

(10) Patent No.: US 11,829,836 B2
(45) Date of Patent: Nov. 28, 2023

(54) BARCODE DETECTION DEVICE WITH WIDTH CALIBRATION

(71) Applicant: PIXART IMAGING INC., Hsin-Chu County (TW)

(72) Inventor: Wen-Han Yao, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/951,232

(22) Filed: Sep. 23, 2022

(65) Prior Publication Data

US 2023/0011294 A1     Jan. 12, 2023

Related U.S. Application Data

(62) Division of application No. 17/333,197, filed on May 28, 2021, now Pat. No. 11,544,489.

(51) Int. Cl.
*G06K 7/14*     (2006.01)
*G06K 19/06*     (2006.01)

(52) U.S. Cl.
CPC ......... *G06K 7/1456* (2013.01); *G06K 7/1417* (2013.01); *G06K 19/06028* (2013.01); *G06K 19/06131* (2013.01)

(58) Field of Classification Search
CPC ............... G06K 7/1456; G06K 7/1417; G06K 19/06028; G06K 19/06131; G06K 7/1413
See application file for complete search history.

(56) References Cited

U.S. PATENT DOCUMENTS 6,674,919 B1 *    1/2004    Ma ....................... G06K 7/1456
                                                              382/199

FOREIGN PATENT DOCUMENTS

KR            101293703 B1     8/2013

* cited by examiner

*Primary Examiner* — Matthew Mikels
(74) *Attorney, Agent, or Firm* — HAUPTMAN HAM, LLP

(57) ABSTRACT

There is provided a barcode detection device including an image sensor and a processor. The image sensor captures an image frame of a barcode. The processor calculates a gradient vector of bars of the barcode in the image frame for determining a rotation angle of the image sensor. The rotation angle is used to calibrate a detected bar width.

19 Claims, 5 Drawing Sheets

| (GX22,GY22) | (GX23,GY23) | ... | (GX2N-1,GY2N-1) | (GX32,GY32) | (GX33,GY33) | (GX3N-1,GY3N-1) | ... | (GXN-1N-1,GYN-1N-1) |

BARCODE DETECTION DEVICE WITH WIDTH CALIBRATION

RELATED APPLICATIONS

The present application is a divisional application of U.S. patent application Ser. No. 17/333,197 filed on May 28, 2021, the disclosure of which is hereby incorporated by reference herein in its entirety.

BACKGROUND

1. Field of the Disclosure

This disclosure generally relates to an optical barcode detection device and, more particularly, to a barcode detection device that calibrates a rotation angle of the barcode detection device.

2. Description of the Related Art

It is known that a barcode can be used to indicate the position or the object on which the barcode is arranged. Using different combinations of widths or colors of bars to form different barcodes, it is able to distinguish different positions or different objects by a sensor that moves over the different barcodes.

However, when the sensor detects one barcode with a rotation angle, the detected width of bars of the one barcode upon which the sensor locates can be changed such that an incorrect width is detected. If this rotation angle is not calibrated, the operations based on the rotation angle may cause mistakes.

Accordingly, the present disclosure further provides an optical barcode detection device that determines a rotation angle of the barcode detection device with respect to a barcode under detection before outputting a detection result.

SUMMARY

The present disclosure provides an optical barcode detection device that calculates a gradient vector of a barcode for determining a rotation angle of the barcode detection device with respect to the barcode.

The present disclosure further provides an optical barcode detection device that calculates a gradient vector of a barcode for determining a scan direction and an operation state of the barcode detection device.

The present disclosure further provides an optical barcode detection device that directly determines a scan direction of a sensor by identifying which of four predetermined angle regions that a calculated gradient vector of a barcode locates.

The present disclosure provides a barcode detection device including an image sensor and a processor. The image sensor is configured to capture an image frame of a barcode, wherein the image frame has a size of N×N pixels, and the barcode has separately arranged multiple bars. The processor is coupled to the image sensor, and configured to calculate an angle difference between a gradient direction in the captured image frame and a predetermined direction of the captured image frame, calculate a scanned width of the multiple bars, and calibrate the scanned width using the angle difference to obtain a calibrated width.

The present disclosure further provides a barcode detection device including an image sensor and a processor The image sensor is configured to capture an image frame of a barcode, wherein the image frame has a size of N×N pixels, and the barcode has separately arranged multiple bars. The processor is coupled to the image sensor, and configured to calculate a gradient direction in the captured image frame, select a direction from four predetermined directions, which is closest to the gradient direction, of the captured image frame, and calibrate a scanned width of the multiple bars using an angle difference between the gradient direction and the selected direction.

BRIEF DESCRIPTION OF THE DRAWINGS

Other objects, advantages, and novel features of the present disclosure will become more apparent from the following detailed description when taken in conjunction with the accompanying drawings.

FIG. 3 is a schematic diagram of a line buffer for storing gradient vectors calculated by a barcode detection device according to one embodiment of the present disclosure.

DETAILED DESCRIPTION OF THE EMBODIMENT

It should be noted that, wherever possible, the same reference numbers will be used throughout the drawings to refer to the same or like parts.

The barcode detection device of the present disclosure is adapted to calibrate a rotation angle (as well as to identify a scanned width, if needed) of bars of a barcode and determine a scan direction before recognizing the barcode. In this way, the barcode detection device of the present disclosure can identify whether it is lifted up or still being operated during the recognizing to avoid error recognition of the barcode. Furthermore, the barcode detection device of the present disclosure only needs to scan once along the determined scan direction so as to reduce computation loading, which is generally ¼ of the computation loading of conventional detection devices that determine a scan direction after scanning four directions.

Figure 1:
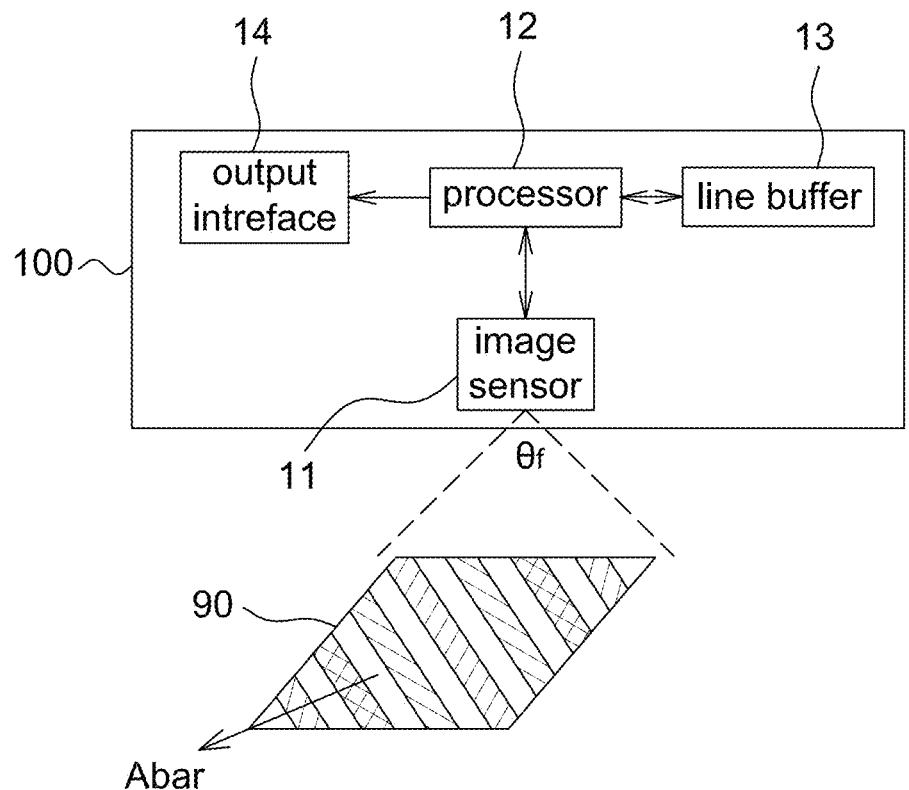
FIG. 1 is a schematic block diagram of a barcode detection device according to one embodiment of the present disclosure.

Please referring to FIG. 1, it is a schematic block diagram of a barcode detection device 100 according to one embodiment of the present disclosure. The barcode detection device 100 includes an image sensor 11, a processor 12, a line buffer 13 and an output interface 14. In another aspect, the line buffer 13 is arranged inside the processor 12. In another aspect, the line buffer 13 is replaced by a frame buffer. The barcode detection device 100 is arranged on an object, e.g., a character figure, and is used to detect different barcodes via one surface of the object.

The output interface 14 is a wireless interface, e.g., a Bluetooth interface, but not limited to. The output interface 14 is used to communicate with an external host, e.g., a game host, a cellphone or the like. In another aspect, the barcode detection device 100 does not include the output interface 14, and the processor 12 controls the object on which the barcode detection device 100 is embedded.

The image sensor 11 is a CMOS image sensor, a CCD image sensor or the like, and is used to capture an image frame of a barcode 90, which has separately arranged multiple bars. The multiple bars have different colors or different reflectivity, e.g., represented by different filled types of lines in FIG. 1, to form a specific code for indicating a position or an object.

Figure 2:
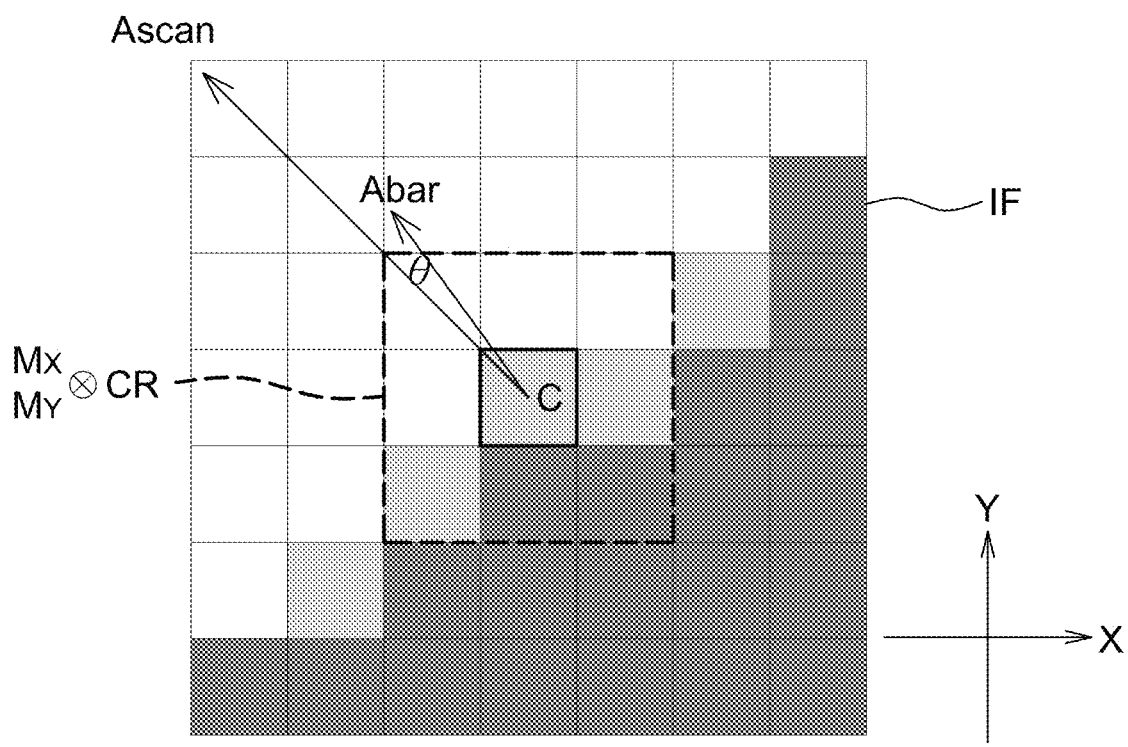
FIG. 2 is a schematic diagram of a scan direction and a gradient vector of a convolution region in an image frame captured by an image sensor of a barcode detection device according to one embodiment of the present disclosure.

For example, FIG. 2 shows an image frame IF captured by the image sensor 11 of the barcode detection device 100. The image frame IF has a size of N×N pixels, e.g., shown as 7×7 pixels, but not limited to. For illustration purposes, FIG. 2 only shows an edge of a bar of the barcode 90 without showing images of other bars. In actual operation, the image frame IF preferably contains images of multiple bars of the barcode 90. FIG. 1 shows that a field of view θf of the image sensor 11 covers one barcode 90.

The processor 12 is a microcontroller unit (MCU) or an application specific integrated circuit (ASIC), and performs calculations and operations thereof (described below) using hardware and/or firmware. The processor 12 is coupled to the image sensor 11 to receive the captured image frame IF therefrom, and determines a scan direction Ascan (as shown in FIG. 2) of scanning the multiple bars of the barcode 90 and determines an arrangement angle Abar (as shown in FIGS. 1 and 2) of the multiple bars of the barcode 90 to accordingly calibrate a rotation angle θ, described below. More specifically, if the scan direction Ascan does not match the arrangement angle Abar (i.e. having an included angle θ therebetween), it means that the rotation angle θ is not calibrated and the scanned width of the bars of the barcode 90 is not correct. And when the rotation angle θ is calibrated then a correct scanned width of the bars of the barcode 90 could be obtained.

In the present disclosure, the processor 12 calculates a convolution of the image frame IF respectively with a first gradient matrix $M_X$ and a second gradient matrix $M_Y$ to obtain (N−1)×(N−1) gradient vectors, for example, $$M_X = \begin{bmatrix} -1 & 0 & 1 \\ -2 & 0 & 2 \\ -1 & 0 & 1 \end{bmatrix} \text{ and } M_Y = \begin{bmatrix} -1 & -2 & -1 \\ 0 & 0 & 0 \\ 1 & 2 & 1 \end{bmatrix}.$$

As shown above, the first gradient matrix $M_X$ is used to subtract a left column from a right column, separated from the left column by one pixel column, of the image frame IF to obtain an X-gradient component of the gradient vector associated with a convolution region CR (as shown in FIG. 2) of the image frame IF; and the second gradient matrix $M_Y$ is used to subtract an upper row from a lower row, separated from the upper row by one pixel row, of the image frame IF to obtain a Y-gradient component of the gradient vector associated with the convolution region CR (as shown in FIG. 2) of the image frame IF.

In another aspect, the first gradient matrix is used to subtract a right column from a left column, separated from the right column by one pixel column, of the image frame IF to obtain an X-gradient component of the gradient vector associated with a convolution region CR of the image frame IF; and the second gradient matrix $M_Y$ is used to subtract an lower row from a upper row, separated from the lower row by one pixel row, of the image frame IF to obtain a Y-gradient component of the gradient vector associated with the convolution region CR of the image frame IF. That is, in $M_X$, the first column contains positive components, and the third column contains negative components; and in $M_Y$, the first row contains positive components, and the third row contains negative components. It is appreciated that sizes of $M_X$ and $M_Y$ are not limited to 3×3.

Referring to FIG. 2 again, the first gradient matrix $M_X$ and the second gradient matrix $M_Y$ are respectively convoluted with a convolution region CR which moves or scans from the top left corner of the image frame IF to the lower right corner of the image frame IF such that (N−1)×(N−1) times of convolution between the first gradient matrix $M_X$ and the convolution region CR are calculated by the processor 12, and (N−1)×(N−1) times of convolution between the second gradient matrix $M_Y$ and the convolution region CR are calculated.

The convolution between the first gradient matrix $M_X$ and one convolution region CR obtains one X-component of a gradient vector, shown as $G_{X22}$, $G_{X23}$ ... $G_{XN-1N-1}$ in FIG. 3. The convolution between the second gradient matrix $M_Y$ and one convolution region CR obtains one Y-component of a gradient vector, shown as $G_{Y22}$, $G_{Y23}$ ... $G_{YN-1N-1}$ in FIG. 3.

As shown in FIG. 3, the line buffer 13 is used to store the calculated gradient vectors. For example, when a center C of the convolution region CR is at (2,2) of the image frame IF, the convolution between the convolution region CR and the first gradient matrix $M_X$ obtains an X-component $G_{X22}$; and the convolution between the convolution region CR and the second gradient matrix $M_Y$ obtains a Y-component $G_{Y22}$, shown as a gradient vector ($G_{X22}$, $G_{Y22}$). Then, the center C of the convolution region CR moves right by one pixel to (2,3), and the convolution between the convolution region CR and the first gradient matrix $M_X$ as well as the second gradient matrix $M_Y$ obtains a gradient vector ($G_{X23}$, $G_{Y23}$). The convolution region CR is then sequentially moved toward the right-lower corner to totally obtain a number of (N−1)×(N−1) gradient vectors sequentially stored in the line buffer 13. In the present disclosure, the convolutions when the center C is located at edge pixels are not calculated.

It is appreciated that if the first gradient matrix $M_X$ and a second gradient matrix $M_Y$ have a larger size, e.g., 4×4, a number of times for calculating the convolution between the convolution region CR (also having 4×4 pixels) and the first gradient matrix $M_X$ as well as the second gradient matrix $M_Y$ is decreased, e.g., obtaining (N−2)×(N−2) gradient vectors.

Then, the processor 12 calculates an average gradient vector ($G_{Xave}$, $G_{Yave}$) of the (N−1)×(N−1) gradient vectors associated with (N−1)×(N−1) convolution regions CR of the image frame IF, wherein the average gradient vector also has an X-component $G_{Xave}$ and a Y-component $G_{Yave}$. Referring to FIG. 3, $$G_{Xave} = (G_{X22} + G_{X23} + \ldots + G_{X2N-1} + G_{X32} + G_{X33} + \ldots + G_{X3N-1} + \ldots + G_{XN-1N-1})/(N-1)^2$$

$$G_{Yave} = (G_{Y22} + G_{Y23} + \ldots + G_{Y2N-1} + G_{Y32} + G_{Y33} + \ldots + G_{Y3N-1} + \ldots + G_{YN-1N-1})/(N-1)^2$$

However, in calculating the average gradient vector ($G_{Xave}$, $G_{Yave}$), the (N−1)×(N−1) gradient vectors are not always directed to a same direction. Mostly, about a half of gradient vectors among the (N−1)×(N−1) gradient vectors are positive and another half of gradient vectors among the (N−1)×(N−1) gradient vectors are negative (i.e. directed in opposite directions); and thus the average gradient vector ($G_{Xave}$, $G_{Yave}$) are close to (0,0) without considering noises.

In one aspect, the negative gradient vector herein is referred to a gradient vector that has a negative value of arrangement angle Abar (e.g., calculated by arctan($G_{Y22}/G_{X22}$), arctan($G_{Y23}/G_{X23}$), ..., arctan($G_{YN-1N-1}/G_{XN-1N-1}$)); and a positive gradient vector herein is referred to a gradient vector that has a positive value of arrangement angle Abar.

In a word, to solve the cancellation issue (e.g., summation of gradient vectors having opposite directions becoming 0) in calculating the average gradient vector ($G_{Xave},G_{Yave}$), gradient vectors having opposite directions are firstly changed to the same direction before calculating the average gradient vector ($G_{Xave},G_{Yave}$).

In one aspect, it is possible to calculate the inner product of two gradient vectors among the (N−1)×(N−1) gradient vectors to determine whether the two gradient vectors are in the same direction or not. If the inner product of two gradient vectors is larger than 0, then the two gradient vectors are in the same direction. If the inner product of two gradient vectors is not larger than 0, it is known that one of the two gradient vectors directs to a first direction and the other one of the two gradient vectors directs to a second direction, e.g., opposite to the first direction. By adding a minus sign to the other one gradient vector directing to the second direction, a direction of the other one gradient vector is changed to direct to the first direction.

In another aspect, it is possible to calculate the absolute difference between two gradient vectors among the (N−1)×(N−1) gradient vectors to determine whether the two gradient vectors are in the same direction or not. If the angle difference of two gradient vectors is smaller than 90 degrees, the two gradient vectors are in the same direction. If the angle difference of two gradient vectors is not smaller than 90 degrees, it is known that one of the two gradient vectors directs to a first direction and the other one of the two gradient vectors directs to a second direction, e.g., opposite to the first direction. By adding a minus sign to the other one gradient vector directing to the second direction, a direction of the other one gradient vector is changed to direct to the first direction.

Then, the average gradient vector ($G_{Xave},G_{Yave}$) is calculated by averaging (N−1)×(N−1) gradient vectors directing to the first direction (including direction changed and non-changed gradient vectors); or, by averaging the gradient vectors among the (N−1)×(N−1) gradient vectors directing only to the first direction or directing only to the second direction and ignoring gradient vectors not directing to the same direction.

In one aspect, the arrangement angle Abar (also called a gradient direction of multiple bars herein) is calculated using arctan($G_{Yave}/G_{Xave}$) by the processor 12. As the scan direction Ascan in scanning the multiple bars of the barcode 90 in the image frame IF is only set in four directions, including a longitudinal direction Y, a transverse direction X, a 45-degree tilt direction (a diagonal line) and a 135-degree tilt direction (another diagonal line) of the image frame IF, the processor 12 further calculates an angle difference θ between the arrangement angle Abar and a predetermined direction selected from the longitudinal direction Y, the transverse direction X, the 45-degree tilt direction and the 135-degree tilt direction of the image frame IF.

For example, after the arrangement angle Abar is obtained, the processor 12 selects one of the longitudinal direction Y, the transverse direction X, the 45-degree tilt direction and the 135-degree tilt direction closest to the arrangement angle Abar of the average gradient vector ($G_{Yave},G_{Xave}$), e.g., FIG. 2 showing 135-degree tilt direction being selected. The processor 12 then calculates a difference between the arrangement angle Abar of the average gradient vector ($G_{Yave},G_{Xave}$) and a selected direction, e.g., 135-degree diagonal direction in FIG. 2, as the angle difference θ.

Figure 4:
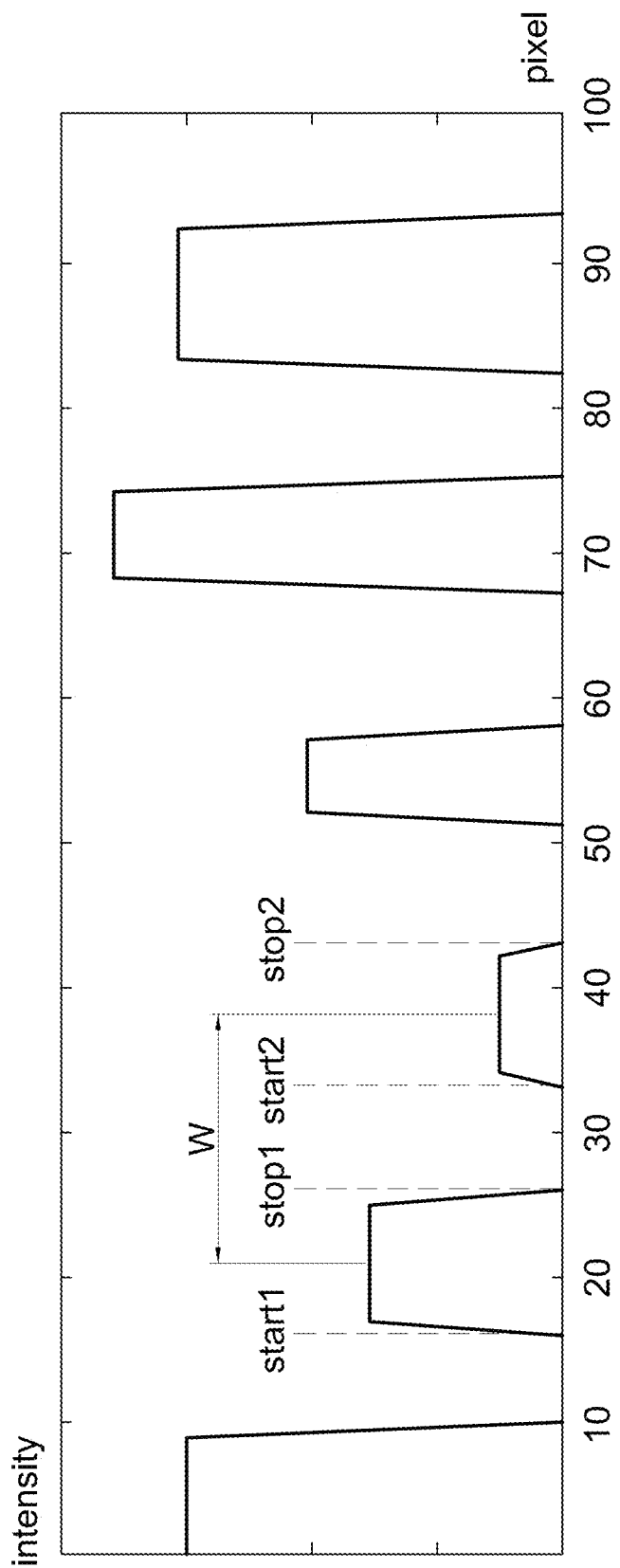
FIG. 4 is a schematic diagram of calculating a scanned width by a barcode detection device according to one embodiment of the present disclosure.

The processor 12 also calculates a scanned width W of the multiple bars. Referring to FIG. 4, in one aspect, the processor 12 calculates the scanned width W using two adjacent bars in the image frame IF. For example, the processor 12 uses the equation [(stop2−stop1)+(start2−start1)]/4 to calculate the scanned width W, wherein the stop2, stop1, start2 and start1 are pixel positions. In another aspect, the processor 12 may use other method to calculate the scanned width W. For example, W=(stop1−start1) or W=(stop2−start2). If there is an angle difference θ between Abar and Ascan, the scanned width W is not taken as a real width of the multiple bars of the barcode 90.

After the scanned width W is obtained, the processor 12 calibrates the scanned width W using the angle difference θ to obtain a calibrated width, e.g., Wcal=W/secθ.

As mentioned above, the calibrated width Wcal indicates the real width of the bars, the spaces or a bar pitch of the barcode 90. In one aspect, the processor 12 compares the calibrated width Wcal with a predetermined threshold to determine whether the barcode detection device 100 is lifted by a user or not. For example, if the calibrated width Wcal is smaller than the predetermined threshold, the barcode detection device 100 is determined to be lifted. For example, if the barcode detection device 100 is determined to be lifted, the processor 12 does not recognize the current barcode or does not output the recognized barcode from the output interface 14 or does not perform the predetermined control. In another aspect, the calibrated width Wcal is used to indicate a lifted height. For example, the calibrated width Wcal is compared with multiple thresholds, each interval between two thresholds indicating one height, to determine a height of the barcode detection device 100 with respect to the barcode 90.

In another aspect, the processor 12 further identifies a variation of the average gradient vector ($G_{Yave},G_{Xave}$) or the arrangement angle Abar to determine whether the barcode detection device 100 is steady or not. For example, if the average gradient vector ($G_{Yave},G_{Xave}$) or the arrangement angle Abar changes between adjacent or successive image frames, it means that the barcode detection device 100 is still being operated by a user and thus the processor 12 does not recognize the current barcode or does not output the recognized result from the output interface 14 or does not perform the predetermined control.

As mentioned above, the average gradient vector ($G_{Yave},G_{Xave}$) is used to calculate the arrangement direction Abar of the multiple bars of the barcode 90, e.g., calculating arctan($G_{Yave}/G_{Xave}$), and then used to determine a scan direction of scanning the multiple bars closest to the arrangement direction Abar. However, the computation of arctan($G_{Yave}/G_{Xave}$) is difficult to be implemented using the hardware. In some scenarios that a width deviation of the multiple bars of the barcode 90 caused by the angle difference θ is tolerable or ignorable, the processor 12 uses another way to determine a scan direction of scanning the multiple bars of the barcode 90 according to the X-component $G_{Xave}$ and the Y-component $G_{Yave}$ of the average gradient vector ($G_{Yave},G_{Xave}$).

Figure 5:
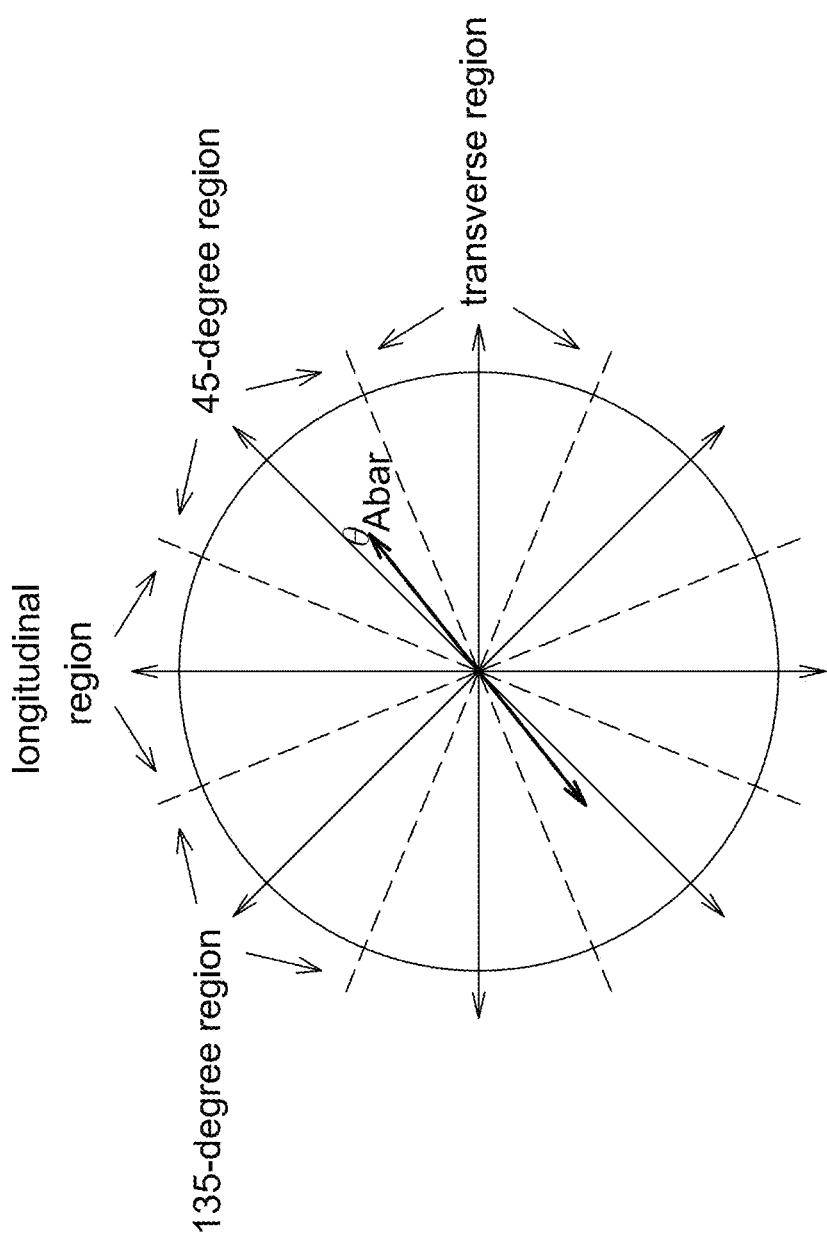
FIG. 5 is a schematic diagram of selecting a scan direction from four directions according to a gradient vector calculated by a barcode detection device according to one embodiment of the present disclosure.

For example, when 53×|$G_{Xave}$|>128×|$G_{Yave}$| (i.e. within a transverse region as shown FIG. 5), the scan direction Ascan is determined as a transverse direction X of the image frame IF; when 53×|$G_{Yave}$|>128×|$G_{Xave}$| (i.e. within a longitudinal region as shown FIG. 5), the scan direction Ascan is determined as a longitudinal direction Y of the image frame IF; when $G_{Xave}$×$G_{Yave}$>0 (i.e. within a 45-degree region as shown FIG. 5), the scan direction Ascan is determined as a 45-degree tilt direction of the image frame IF, and otherwise (i.e. within a 135-degree region as shown FIG. 5), the scan direction Ascan is determined as a 135-degree tilt direction of the image frame IF. This computation is directly embedded in the hardware of the processor 12. FIG. 5 shows that the arrangement direction Abar is within the 45-degree region, and the scan direction is determined along 45-degree tilt direction. It is also possible to obtain an angle difference θ using FIG. 5.

It should be mentioned that although the gradient vector mentioned in the above embodiments is a gradient vector of multiple bars, the gradient vector is also a gradient vector of spaces between the multiple bars since each space is arranged between two adjacent bars.

As mentioned above, if the sensor is not steady during recognizing a barcode, an incorrect barcode may be recognized. Accordingly, the present disclosure further provides an optical barcode detection device (e.g., FIG. 1) that calculates an arrangement angle of multiple bars of the barcode under detection at first, and the calculated arrangement angle is then used to determine a scan direction of scanning the barcode and to calibrate a scanned width of the multiple bars. The calibrated width is used to determine a height of the barcode detection device with respect to the barcode.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A barcode detection device, comprising:
    an image sensor, configured to capture an image frame of a barcode, wherein the image frame has a size of N×N pixels, and the barcode has separately arranged multiple bars; and
    a processor, coupled to the image sensor, and configured to
        calculate an angle difference between a gradient direction in the captured image frame and a predetermined direction of the captured image frame,
        calculate a scanned width of the multiple bars,
        calibrate the scanned width using the angle difference to obtain a calibrated width, and
        compare the calibrated width with a threshold to determine whether the barcode detection device is lifted or not.

2. The barcode detection device as claimed in claim 1, wherein the processor is configured to
    calculate an average gradient vector of (N−1)×(N−1) gradient vectors of (N−1)×(N−1) convolution regions of the image frame as the gradient direction of the multiple bars,
    wherein the predetermined direction comprises a longitudinal direction, a transverse direction, a 45-degree tilt direction and a 135-degree tilt direction of the image frame.

3. The barcode detection device as claimed in claim 2, wherein the processor is configured to calculate the gradient direction of the average gradient vector by
    calculating convolutions of the (N−1)×(N−1) convolution regions of the image frame respectively with a first gradient matrix and a second gradient matrix to obtain the (N−1)×(N−1) gradient vectors,
    averaging the (N−1)×(N−1) gradient vectors to obtain the average gradient vector, which has an X-component and a Y-component, and
    calculating arctan(Y-component/X-component) as the gradient direction of the average gradient vector.

4. The barcode detection device as claimed in claim 1, wherein the processor is configured to calculate the scanned width using two adjacent bars in the image frame.

5. The barcode detection device as claimed in claim 2, wherein in calculating the average gradient vector, the processor is configured to
    recognize gradient vectors among the (N−1)×(N−1) gradient vectors directing to a first direction and a second direction,
    change the gradient vectors among the (N−1)×(N−1) gradient vectors directing to the second direction to direct to the first direction, and
    average (N−1)×(N−1) gradient vectors directing to the first direction.

6. The barcode detection device as claimed in claim 2, wherein in calculating the average gradient vector, the processor is configured to
    recognize gradient vectors among the (N−1)×(N−1) gradient vectors directing to a first direction and a second direction, and
    average the gradient vectors among the (N−1)×(N−1) gradient vectors directing only to the first direction or directing only to the second direction.

7. The barcode detection device as claimed in claim 2, wherein in calculating the average gradient vector, the processor is configured to
    calculate an inner product or an angle difference of two gradient vectors among the (N−1)×(N−1) gradient vectors to determine whether the two gradient vectors direct to a same direction or not.

8. The barcode detection device as claimed in claim 1, wherein the barcode detection device is arranged on a character figure.

9. The barcode detection device as claimed in claim 8, further comprising a wireless interface configured to be coupled to a game host.

10. The barcode detection device as claimed in claim 1, wherein the multiple bars have different colors or different reflectivity.

11. The barcode detection device as claimed in claim 2, wherein the processor is further configured to identify a variation of the average gradient vector to determine whether the barcode detection device is steady or not.

12. A barcode detection device, arranged on a character figure, and the barcode detection device comprising:
    an image sensor, configured to capture an image frame of a barcode, wherein the image frame has a size of N×N pixels, and the barcode has separately arranged multiple bars; and
    a processor, coupled to the image sensor, and configured to
        calculate an angle difference between a gradient direction in the captured image frame and a predetermined direction of the captured image frame,
        calculate a scanned width of the multiple bars, and
        calibrate the scanned width using the angle difference to obtain a calibrated width.

13. The barcode detection device as claimed in claim 12, wherein the processor is configured to calculate an average gradient vector of (N−1)×(N−1) gradient vectors of (N−1)×(N−1) convolution regions of the image frame as the gradient direction of the multiple bars.

14. The barcode detection device as claimed in claim 12, wherein the predetermined direction comprises a longitudinal direction, a transverse direction, a 45-degree tilt direction and a 135-degree tilt direction of the image frame.

15. The barcode detection device as claimed in claim 12, wherein the processor is configured to calculate the scanned width using two adjacent bars in the image frame.

16. A barcode detection device, comprising:
    an image sensor, configured to capture an image frame of a barcode, wherein the image frame has a size of N×N pixels, and the barcode has separately arranged multiple bars, which have different colors or different reflectivity; and
    a processor, coupled to the image sensor, and configured to
        calculate an angle difference between a gradient direction in the captured image frame and a predetermined direction of the captured image frame,
        calculate a scanned width of the multiple bars, and
        calibrate the scanned width using the angle difference to obtain a calibrated width.

17. The barcode detection device as claimed in claim 16, wherein the processor is configured to calculate an average gradient vector of (N−1)×(N−1) gradient vectors of (N−1)×(N−1) convolution regions of the image frame as the gradient direction of the multiple bars.

18. The barcode detection device as claimed in claim 16, wherein the predetermined direction comprises a longitudinal direction, a transverse direction, a 45-degree tilt direction and a 135-degree tilt direction of the image frame.

19. The barcode detection device as claimed in claim 16, wherein the processor is configured to calculate the scanned width using two adjacent bars in the image frame.

* * * * *